United States Patent [15] 3,707,603

Limberg [45] Dec. 26, 1972

[54] FM STEREOPHONIC RECEIVER DETECTION APPARATUS AND DISABLING MEANS

[72] Inventor: Allen LeRoy Limberg, Somerville, N.J.

[73] Assignee: RCA Corporation

[22] Filed: Dec. 29, 1969

[21] Appl. No.: 888,390

[52] U.S. Cl. ....................179/15 BT

[51] Int. Cl. ....................H04h 5/00

[58] Field of Search ....................179/15 BT; 325/36

[56] References Cited

UNITED STATES PATENTS

| | | | |
|---|---|---|---|
| 3,219,760 | 11/1965 | Loughlin | 179/15 BT |
| 3,328,529 | 6/1967 | Heald | 179/15 BT |
| 3,384,716 | 5/1968 | Takano | 179/15 BT |
| 3,294,912 | 12/1966 | Merritt | 179/15 BT |
| 3,294,916 | 12/1966 | Elias | 179/15 BT |
| 3,573,382 | 4/1971 | Feit | 179/15 BT |
| 3,319,004 | 5/1967 | Avins | 179/15 BT |

*Primary Examiner*—Kathleen H. Claffy
*Assistant Examiner*—Tom D'Amico
*Attorney*—Eugene M. Whitacre

[57] ABSTRACT

A detector for deriving stereophonic audio difference (L−R) signal from a stereophonic composite signal and matrix amplifier means coupled to the detector for combining the difference signals with audio sum (L+R) signals to produce left (L) and right (R) audio signals. Automatic switching means for transferring the system between monophonic and stereophonic reproduction modes is also provided. The system is adapted for fabrication in integrated circuit form.

18 Claims, 1 Drawing Figure

PATENTED DEC 26 1972
3,707,603
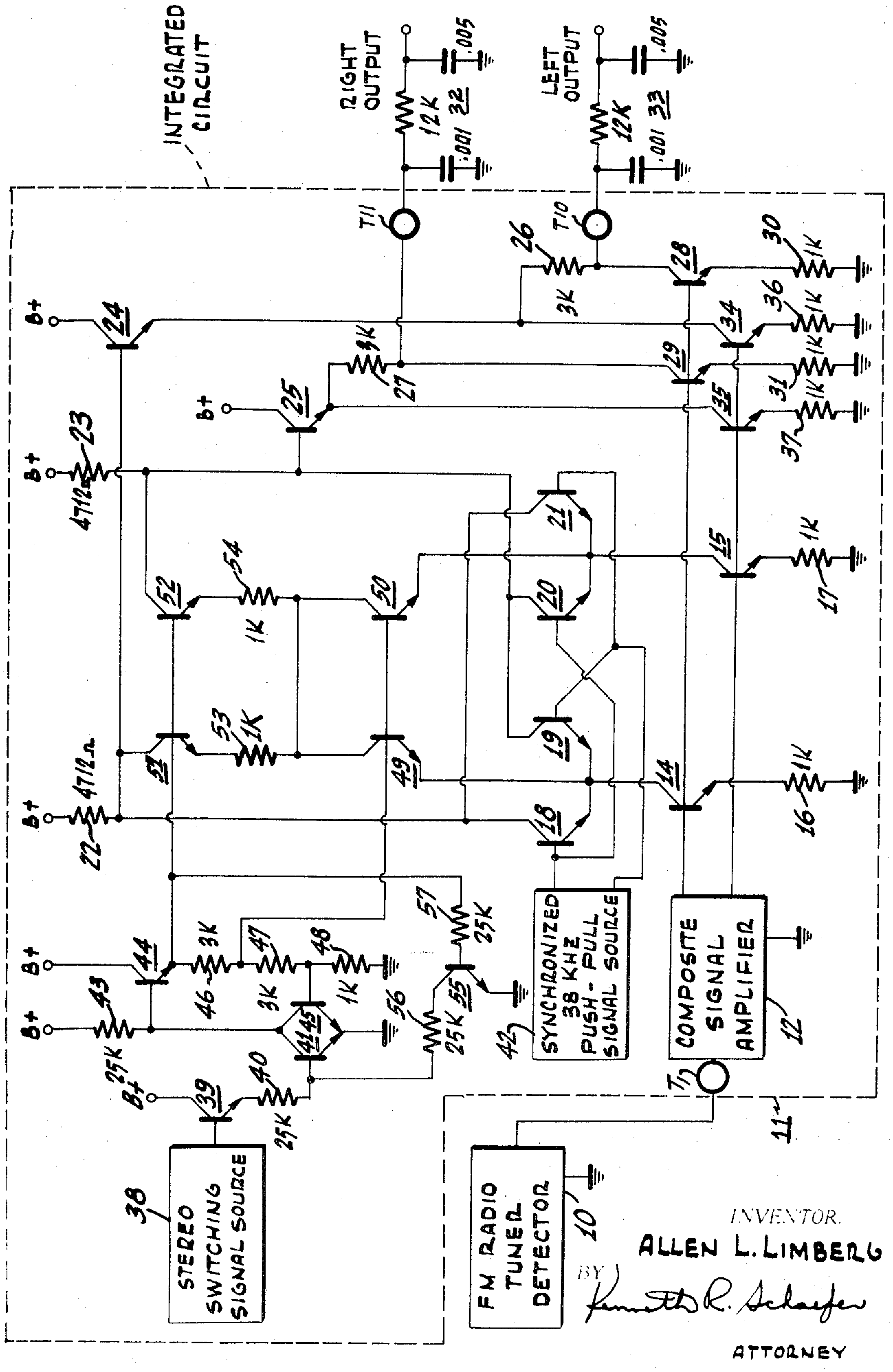
INVENTOR.
ALLEN L. LIMBERG
BY Kenneth R. Schaefer
ATTORNEY

FM STEREOPHONIC RECEIVER DETECTION APPARATUS AND DISABLING MEANS

This invention relates to a matrix amplifier for stereophonic FM (frequency modulation) broadcast receivers and to automatic means for switching such an amplifier between monophonic and stereophonic reproduction modes.

Under the presently employed method of FM stereophonic broadcasting in the United States, a main carrier wave is frequency modulated by the sum of two audio frequency signals such as two stereophonically related left (L) and right (R) signals, the carrier wave being adapted for compatible reception by either monophonic or stereophonic receivers. The main carrier wave further is provided with stereophonic information in the form of a suppressed subcarrier wave amplitude modulated with the difference of the two stereophonically related signals (L–R) and a pilot signal for use in demodulating the suppressed subcarrier wave.

In the stereophonic receiver, a composite signal is produced at the output of the frequency modulation detector, the composite signal comprising the sum (L+R) signal component useable either by monophonic or stereophonic frequency modulation receivers, a 19 KHz (kilohertz) pilot signal and side bands of a suppressed 38 KHz subcarrier representative of the difference (L–R) signal component. In order to reproduce the audio stereophonic program information, a 38 KHz signal is generated in the receiver in timed relation with the 19 KHz pilot signal to permit detection of the difference signal component and its subsequent combination (matrixing) with the sum signal component to reproduce the left and right separated audio signals. In order to prevent crosstalk and consequent loss of separation between the signals, the regenerated 38 KHz signal must be accurately timed and, furthermore, relative signal gains of the sum and difference components must be accurately maintained.

Furthermore, when a frequency modulation station broadcasts monophonic program material and therefore does not transmit a 19 KHz pilot signal, it is desirable to automatically disable the 38 KHz generating circuits. When the broadcast program material does include stereophonic information, it is desirable to activate the stereophonic circuits automatically but only when the 19 KHz pilot signal exceeds a predetermined threshold level, thereby preventing such circuits from responding to noise or other spurious signals.

It is accordingly an object of this invention to provide an improved stereophonic matrix amplifier for FM receivers.

It is a further object of this invention to provide automatic stereo switching means for an FM receiver.

Referring to the drawing, means are shown for detecting an audio difference signal (L–R) component of a composite stereophonic signal and for combining such component with an audio sum (L+R) signal component so as to produce stereophonically related left and right channel audio signals. The illustrated difference signal detector and combining (matrix amplifier) means are particularly adapted for fabrication using integrated circuit techniques.

An FM radio tuner-detector 10 which processes FM broadcast signals to provide composite stereophonic signals is coupled via a terminal $T_1$ of an integrated circuit chip 11 to a composite signal amplifier 12. The composite stereophonic signals comprise an audio frequency sum (L+R) signal in the case of reception of monophonic broadcast material or, in the case of reception of stereophonic broadcast material, the composite stereophonic signal comprises an audio sum signal (L+R) component, a pilot (19 KHz component) and a suppressed subcarrier amplitude modulated by a difference (L–R) signal component. In either case, FM background (SCA) music components also may be coupled to terminal $T_1$.

Composite signal amplifier 12 is arranged to amplify, in a linear manner, signals in the range of approximately 10 Hz to 150 KHz so as to produce first and second substantially identical but 180° out of phase (i.e., push-pull) amplified composite signals for direct application to circuit elements within integrated circuit chip 11.

A specific configuration for amplifier 12, as well as for other circuit elements shown in block diagram form on chip 11, is described in my concurrently filed U.S. Patent application, Ser. No. 888,308 entitled "Multiplex Decoding System" which is assigned to RCA Corporation.

The push-pull composite signal components, along with suitable substantially equal biasing voltages, are direct coupled from amplifier 12 to a difference signal detector indicated generally by the reference numeral 13. Difference signal detector 13 comprises a doubly balanced synchronous detector having first and second current source transistors 14 and 15. The base electrodes of transistors 14 and 15 are directly connected to separate ones of the push-pull composite signal outputs of the composite signal amplifier 12. The emitter electrodes of transistors 14 and 15 are individually returned to ground by resistors 16 and 17, respectively. The collector electrode of transistor 14 is directly connected to joined emitter electrodes of a first pair of switching transistors 18, 19 while the collector electrode of transistor 15 is directly connected to joined emitter electrodes of a second pair of switching transistors 20, 21. The base electrodes of both transistors 18 and 20 are connected to one of a pair of 38 KHz square wave outputs of a synchronized 38 KHz push-pull signal source 42 while the base electrodes of transistors 19 and 21 are connected to the other of the 38 KHz square wave outputs. Square wave signal source 42 is synchronized with respect to the 19 KHz pilot component of the composite signals provided by amplifier 12 in any of the many known techniques employed in FM multiplex stereophonic decoder systems. One particularly advantageous synchronizing system is set forth in my above-identified U.S. Patent application, Ser. No. 888,308.

A source of operating voltage (B+) is coupled to the collector electrodes of each of transistors 18 and 21 by means of an output resistor 22 and to the collector electrodes of each of transistors 19 and 20 by means of an output resistor 23 substantially equal to resistor 22.

Push-pull output signals including the demodulated difference signal components [(L–R) and – (L–R)] are developed across resistors 22 and 23 and are coupled, respectively, to emitter follower output transistors 24 and 25. Transistors 24 and 25 serve as voltage sources to produce the desired push-pull difference signal components across respective matrix resistors 26 and 27. The sum (L+R) signal information is also developed across resistors 26 and 27 by means of respective transistors 28 and 29, the collector electrodes of which are coupled to resistors 26 and 27 remote from transistors 24 and 25. The base electrodes of transistors 28 and 29 both are coupled to one of the push-pull outputs of composite signal amplifier 12. The emitter electrodes of transistors 28 and 29 are returned to ground by means of individual resistors 30 and 31, respectively. Transistors 25 and 29 comprise a first matrix amplifier arrangement, the output of which (e.g., R) is coupled via a terminal $T_{11}$ of chip 11 and a de-emphasis network 32 to audio reproducing means such as an amplifier and loudspeaker (not shown). Transistors 24 and 28 comprise a second matrix amplifier arrangement, the output of which (e.g., L) is coupled via a terminal $T_{10}$ of chip 11 and a de-emphasis network 33 to audio reproducing means such as a second amplifier and loudspeaker (not shown).

In order to maintain the impedance at the emitters of follower transistors 24 and 25 substantially constant as conduction (and therefore the impedances) of transistors 28 and 29 vary with applied composite signals, a composite signal of opposite phase with respect to that of the signal applied to transistors 28 and 29 is applied from amplifier 12 to the base electrodes of compensating transistors 34 and 35. The collector electrodes of transistors 34 and 35 are directly connected, respectively, to the emitter electrodes of followers 24 and 25. The emitter electrodes of transistors 34 and 35 are returned to ground by separate resistors 36 and 37.

As the output signals produced by composite signal amplifier 12 vary, conduction of transistors 28 and 34 vary equally and oppositely (push-pull input signals). Therefore, the sum of the collector currents of transistors 28 and 34 (which load transistor 24) remains substantially constant. Similarly, variations in the output of composite signal amplifier 12 do not produce variations in the load on transistor 25 since the sum of the collector currents of transistors 29 and 35 remains substantially constant as the output of composite signal amplifier 12 varies. Accurate matrixing of the sum and difference signal components is therefore not compromised by variations in loading on voltage source transistors 24 and 25 as the composite signal varies.

In the operation of the difference signal detector 13 described above, the complementary 38 KHz square wave outputs of signal source 42 are provided in predetermined time relationship with respect to the received 19 KHz pilot signal component (and therefore with respect to the suppressed 38 KHz subcarrier) to provide synchronous detection of the difference signal components (L–R) of the amplitude modulated suppressed subcarrier component coupled from amplifier 12 to transistors 14 and 15. That is, the average axis crossings of the 38 KHz square waves coincide in time with average axis crossings of the pilot signal component. The balanced synchronous detector 13 comprising transistors 14, 18, 19 and transistors 15, 20 21 responds to the combination of the complementary 38 KHz square waves and the push-pull composite signals to produce complementary signals including the difference signal components [(L–R) and – (L–R)] across resistors 22 and 23. The output voltages produced across resistors 22 and 23, including the complementary difference signal components, are coupled via transistors 24 and 25 to resistors 26 and 27. Transistors 24 and 25, along with resistors 22 and 23, therefore serve as difference signal voltage sources with respect to resistors 26 and 27.

The composite signals provided by amplifier 12, including the audio sum (L+R) component, are provided as currents via transistors 28 and 29 to resistors 26 and 27 remote from transistors 24 and 25. The total signals, including the voltages representing difference signal components and currents representing sum signal components, are combined in resistors 26 and 27 to produce the desired left (L) and right (R) audio signals at terminals $T_{10}$ and $T_{11}$.

Because of the doubly balanced nature of the illustrated synchronous detector and the low pass characteristics of the de-emphasis networks 32, 33, components (e.g., pilot, 38 KHz switching signals, sum signal, etc.) other than the desired left and right audio frequency signals are not produced across the output filter capacitors of networks 32 and 33.

Correct matrixing of the sum and difference signal components is dependent in part upon matching of the currents supplied by the source transistors 14, 15, 28 and 29. In the integrated circuit environment, such matching is relatively easily accomplished by constructing substantially identical transistors 14, 15, 28 and 29 and substantially identical associated emitter resistors 16, 17, 30 and 31 in close proximity on the chip 11.

Correct matrixing is also dependent upon the ratios of resistors 22 and 23 to resistors 26 and 27, respectively. In the illustrated doubly balanced synchronous detector arrangement, the switching transistors 18, 19, 20, 21 are supplied with 38 KHz symmetrical square waves of correct phasing so that full wave detection of the 38 KHz difference signal subcarrier signal is obtained. The resultant peak to peak amplitude of the audio frequency components of the detected difference signal is related to the peak amplitude of the rectified difference signal carrier wave at the output of the detector 13 by a factor of $2/\pi$. For a left only or a right only audio signal, the peak amplitude of the modulated difference signal carrier wave component of the composite signal is set by the standards for stereophonic broadcasting as equal to the peak amplitude of the sum signal component. Therefore, to obtain proper matrixing of the sum and difference signals, resistors 22 and 23, across which the difference signals are developed, are selected $\pi/2$ times as large as the resistors 26 and 27 across which the sum signal components are developed.

The synchronous difference signal detector 13 further comprises means for automatically disabling operation of the difference signal detection circuits, for example, either when the prolonged absence of pilot signal greater than a predetermined amplitude indicates that non-stereophonic (monophonic) program material is being received or when the signal-to-noise ratio of the received signal is judged too poor for satisfactory stereophonic reproduction. One system for producing a "stereo-mono" switching signal is described in my above-identified U.S. Patent application, Ser. No. 888,308. For purposes of the present discussion it is sufficient to recognize that such a switching signal is produced for either of the above-noted conditions.

In the apparatus shown in the drawing, stereophonic-monophonic switching signals are supplied by a stereo switching signal source 38 to an amplifier comprising a first transistor 39 having a collector electrode connected to a source of operating voltage (B+), a base electrode coupled to stereo switching signal source 38 and an emitter electrode coupled via a resistor 40 to the base electrode of a switching transistor 41. The emitter electrode of transistor 41 is connected to ground and an output switching signal is derived at the collector electrode thereof across a resistor 43 coupled to the source of operating voltage. The output of switching transistor 41 is coupled to a multiple $V_{BE}$ bias supply of the type described in my U.S. Patent application, Ser. No. 680,483, filed Nov. 3, 1967, entitled "Electrical Circuits" and assigned to the same assignee as the present invention. As used herein, the term $V_{BE}$ is defined as the forward voltage drop across the base-emitter junction of a normally conducting transistor (e.g., approximately 0.65 to 0.7 volts for silicon transistors such as are fabricated in integrated circuits). Reference voltage supplies (usually internal to the integrated circuit) which provide one or more integral multiples of $V_{BE}$ above ground potential at a low impedance are designated as "multiple $V_{BE}$ supplies."

In the present case, the multiple $V_{BE}$ supply comprises a common collector transistor 44 and a common emitter transistor 45 coupled together in a negative feedback arrangement. The collector electrode of transistor 44 is coupled to the source of operating voltage while a plurality of resistors 46, 47, 48 are coupled in series relation between the emitter electrode of transistor 44 and ground. The junction of resistors 47 and 48 is connected to the base electrode of transistor 45. The emitter electrode of transistor 45 is connected to ground while the collector electrode of transistor 45 is directly connected to the base electrode of transistor 44. As is explained in my application, Ser. No. 680,483, when transistors 44 and 45 are conducting, a voltage equal to $V_{BE}$ exists across resistor 48. Resistor 48 is selected smaller than the base-emitter impedance of transistor 45 and the additional resistors 46, 47 are selected smaller than the input impedances of the respective circuits to which they are coupled. In that case, voltages are developed across each of the series connected resistors 46, and 47 equal to the product of $V_{BE}$ and the ratio between the particular resistor (46 or 47) and resistor 48. Specifically, voltages of 7 $V_{BE}$ and 4 $V_{BE}$ are developed at the emitter electrode of transistor 44 and at the junction of resistors 46 and 47, respectively.

The junction of resistors 46 and 47 is coupled to the base electrodes of a pair of stereo switching or stereo killer transistors 49 and 50. The emitter electrodes of transistors 49 and 50 are coupled, respectively, to the joined emitter electrodes of switching transistors 18, 19 and the joined emitter electrodes of switching transistors 20, 21. The collector electrodes of transistors 49 and 50 are directly joined together and this collector junction is connected to the emitter electrodes of respective current splitter transistors 51 and 52 via separate emitter resistors 53 and 54. The base electrodes of current splitter transistors 51 and 52 are directly connected to the emitter electrode of transistor 49 (7 $V_{BE}$ when the multiple $V_{BE}$ supply is operating). The collector electrodes of splitter transistors 51 and 52 are connected to resistors 22 and 23, respectively.

A feedback circuit is coupled between the input and output of the switched multiple $V_{BE}$ supply to increase the rate at which the system switches from stereophonic to monophonic mode. This circuit comprises a transistor 55 having a collector electrode coupled via a resistor 56 to the base electrode of transistor 41, a base electrode coupled via a resistor 57 to the emitter electrode of transistor 44 and an emitter electrode connected to ground.

In operation, upon the loss of stereophonic information suitable for reproduction or when the detected signal is too noisy for satisfactory reproduction as is explained in my application, Ser. No. 888,308, the voltage at the base electrode of transistor 39 falls below a predetermined level (e.g., 1 volt) and transistors 39 and 41 begin to switch to an off or non-conductive condition. The voltage at the base electrode of transistor 44 increases positively causing transistor 44 and then transistor 45 to conduct so that the multiple $V_{BE}$ supply switches on. This switching action is aided by the presence of transistor 55 which commences conduction along with transistors 44 and 45. Transistor 55 serves to switch transistor 41 off rapidly once the switching operation begins. A positive voltage (4 $V_{BE}$) provided at the junction of resistors 46 and 47 causes killer transistors 49 and 50 to conduct. Similarly, a positive voltage (7$V_{BE}$) provided at the emitter electrode of transistor 44 causes splitter transistors 51 and 52 to conduct.

When killer transistors 49 and 50 conduct, a sufficiently positive voltage (3 $V_{BE}$) is coupled to the joined emitter electrodes of switching transistors 18 and 19 and to the joined emitter electrodes of switching transistors 20, 21 to reverse bias such switching transistors and thereby disable the difference signal detector 13. The push-pull composite signals supplied via current source transistors 14 and 15 are then diverted through killer transistors 49 and 50 and cancel each other at the joined collector electrodes of transistors 49, 50. The joined collector electrodes of transistors 49 and 50 also serve to combine the direct current components of the outputs of current source transistors 14 and 15. The combined direct current components are then split into equal components by means of resistors 53, 54 and transistors 51, 52 and the equal components are coupled to load resistors 22 and 23. The direct bias voltage coupled to matrix transistors 24 and 25 is therefore maintained substantially equal for either stereophonic or monophonic reproduction modes. If such direct bias voltage was allowed to change when the operating mode of the system changed, a thump would be heard in the associated loudspeakers. The above-described arrangement precludes production of such an undesirable sound.

The difference signal detector is maintained in an inoperative or bypassed condition until an input to transistor 39 representative of, for example, the presence of adequate pilot signal is provided to switch transistors 39 and 41 on and to thereby switch the multiple $V_{BE}$ supply, and the killer and splitter stages off.

As noted above, an input signal greater than approximately one volt (low current $V_{BE}$ of transistor 39 plus normal current $V_{BE}$ of transistor 41) is sufficient to maintain conduction of transistors 39 and 41 (and therefore maintain operation in the stereophonic mode). However, when transistors 39 and 41 are switched off and transistor 55 is on (i.e., monophonic operating mode), a positive voltage greater than 1 volt is required at the base of transistor 39 to re-initiate stereophonic operation since resistors 40 and 56 are then coupled via transistor 55 as a voltage divider across the input (base emitter) terminals of transistor 41. An input voltage of approximately 3 $V_{BE}$ (approximately 2 volts) is thus required at the base of transistor 39 to switch to stereophonic mode. The difference between the levels required at the base of transistor 39 to initiate and to remain in stereophonic mode provides a desirable hysteresis characteristic whereby once stereophonic reproduction is initiated it will be maintained even though momentary fluctuations occur either in the received pilot signal level or in signal-to-noise ratio of the detected signal.

When stereophonic information suitable for reproduction is received and processed by the associated receiver, a sufficiently positive input voltage is supplied to the base of transistor 39 to render it conductive. Transistor 41 also conducts, so that the input to transistor 44 is not sufficiently positive to produce conduction in transistor 44. The multiple $V_{BE}$ supply comprising transistors 44 and 45 is therefore switched "off" and each of the transistors 49, 50, 51 and 52 is switched "off." Under these conditions, the difference signal detector circuits 13 operate to produce (L–R) and – (L–R) signals in the manner previously described. It should also be noted that transistor 55 is off under these conditions.

The above-described matrix amplifier—automatic switching arrangement also provides the advantage that, should the output terminals $T_{10}$ and $T_{11}$ accidentally be shorted to ground, the resistors 26 and 27 serve to limit current in the associated transistors. Such short circuit protection is particularly desirable in connection with a complex integrated circuit chip having a significant value as in the presently described case.

What is claimed is:

1. In a stereophonic frequency modulation broadcast receiver for processing signals representative of stereophonically related left and right audio signals, the combination comprising:
   - first means for providing composite stereophonic signals comprising an audio sum signal component, a pilot signal component and a subcarrier signal component amplitude modulated by an audio difference signal component;
   - means responsive to said pilot signal component for producing a timing signal recurrent at the frequency of said subcarrier signal;
   - synchronous detection means coupled to said first means and to said timing signal producing means and responsive to said composite and timing signals for producing first and second output signals including, respectively, first and second complementary audio difference signal components;
   - first and second voltage follower means coupled to said synchronous detection means for producing, across respective first and second matrix resistances, first and second voltages representative of said first and second output signals including complementary audio difference signal components, and
   - first and second current supply means coupled to said first means for producing, in said matrix resistances, current components representative of said audio sum signal components
   - whereby output voltage components representative of said left and right audio signals are produced across said matrix resistances.

2. The combination according to claim 1 wherein: said first and second current supply means produce substantially equal current components representative of said composite stereophonic signals including said audio sum signal components in said matrix resistances.

3. The combination according to claim 2 wherein: said first and second current supply means are coupled to said matrix resistances remote from associated respective voltage follower means.

4. The combination according to claim 2 wherein: said first and second current supply means each comprise first and second transistor current sources having input electrodes coupled to complementary composite signal outputs of said first means and current supply electrodes coupled, respectively, to opposite ends of said matrix resistances.

5. The combination according to claim 4 wherein: each of said first and second voltage follower means is coupled directly to an associated first transistor current source and is coupled via its respective matrix resistance to an associated second transistor current source,
   whereby the current load on each said voltage follower means is substantially constant as said composite signal varies.

6. The combination according to claim 2 wherein: said synchronous detection means includes first and second output resistances across which said audio difference signal components are developed, each said output resistance being $\pi/2$ times the associated matrixing resistance.

7. The combination according to claim 6 and further comprising:
   low pass filtering means coupled to each of said matrix resistances for attenuating components above the audio frequency range.

8. The combination according to claim 7 wherein: said low pass filtering means provides de-emphasis of higher audio frequency components.

9. The combination according to claim 2 and further comprising:
   - means for supplying control signals indicative of suitability and non-suitability of received composite signals for stereophonic reproduction, and
   - switching means coupled to said synchronous detection means and to said voltage follower means and responsive to said control signals for enabling and disabling said synchronous detection means.

10. The combination according to claim 9 wherein: said switching means, upon disabling said synchronous detection means, couples predetermined direct voltages to said voltage follower means.

11. The combination according to claim 10 wherein: said switching means provides equal direct voltages to said voltage follower means, said direct voltages being equal to the quiescent voltage supplied to said voltage follower when said synchronous detection means is enabled.

12. In a stereophonic frequency modulation broadcast receiver for processing signals representative of stereophonically related left and right audio signals, the combination comprising:

first means for providing complementary composite stereophonic signal outputs comprising an audio sum signal component, a pilot signal component and a subcarrier signal component amplitude modulated by an audio difference signal component;

means responsive to said pilot signal component for producing a timing signal recurrent at the fundamental frequency of said subcarrier signal;

first and second synchronous detection means coupled to said first means and to said timing signal producing means and responsive to said composite and timing signals for producing first and second output signals including, respectively, first and second complementary audio difference signal components, each said synchronous detection means comprising a separate input transistor coupled to one of said complementary composite signal outputs and a separate load resistance across which one of said complementary audio difference signal components is developed;

means for supplying control signals representative of suitability and non-suitability of received composite signals for stereophonic reproduction; and switching means coupled between each said input transistor and a corresponding one of said load resistances and responsive to said control signals for enabling and disabling said synchronous detection means, said switching means, upon disabling said synchronous detection means, being arranged to couple a predetermined direct voltage across each said load resistance.

13. The combination according to claim 12 wherein: said predetermined direct voltage across each said load resistance is substantially equal to a quiescent voltage provided across said load resistance in the absence of said subcarrier signal component.

14. The combination according to claim 13 wherein: said switching means comprises first and second transistors having their emitter-collector current paths coupled between a common point and a separate one of said input transistors.

15. The combination according to claim 14 wherein: said switching means further comprises third and fourth transistors having their emitter-collector current paths coupled between said common point and a separate one of said load resistances.

16. In a stereophonic frequency modulation broadcast receiver for processing signals representative of stereophonically related left and right audio signals, the combination comprising:

first means for providing composite stereophonic signals comprising an audio sum signal component, a pilot signal component and a subcarrier signal component amplitude modulated by an audio difference signal component;

means responsive to said pilot signal component for producing a timing signal recurrent at the fundamental frequency of said subcarrier signal;

synchronous detection means direct coupled to said first means and to said timing signal producing means and responsive to said composite and timing signals for producing first and second detected output signals, said output signals being in push-pull relation, balanced with respect to said composite signals and each including said audio difference signal components;

a first signal combining circuit direct coupled to said synchronous detection means and to said first means for combining a first of said detected output signals with said audio sum signal component to reproduce one of said stereophonically related audio signals; and a second signal combining circuit direct coupled to said synchronous detection means and to said first means for combining a second of said detected output signals with said audio sum signal component to reproduce the other of said stereophonically related audio signals.

17. The combination according to claim 16 wherein: said synchronous detection means comprises first and second current supplying transistors, direct coupled to said first means, for providing push-pull composite signal currents, first and second detector transistors having emitter electrodes coupled to said first current source, collector electrodes coupled, respectively, to first and second load resistors and base electrodes coupled, respectively, to first and second oppositely phased outputs of said timing signal producing means, said synchronous detection means further comprising third and fourth detector transistors having emitter electrodes coupled to said second current source, collector electrodes coupled, respectively, to said second and first load resistors, and base electrodes coupled, respectively, to said first and second outputs of said timing signal producing means.

18. The combination according to claim 17 wherein:

said first signal combining circuit comprises a first voltage follower transistor coupled to said first load resistor, a third current supplying transistor for providing a composite signal current substantially equal to that provided by said first current supplying transistor, a third resistor coupled between said third transistor and said first voltage follower transistor to develop said first audio signal, and said second signal combining circuit comprises a second voltage follower transistor coupled to said second load resistor, a fourth current supplying transistor for providing a composite signal current substantially equal to that provided by said first current supplying transistor, a fourth resistor coupled between said fourth transistor and said second voltage follower transistor to develop said second audio signal.

* * * * *